US005107244A

United States Patent [19]

Minamide et al.

[11] Patent Number: 5,107,244

[45] Date of Patent: Apr. 21, 1992

[54] BURGLARPROOF DEVICE FOR ELECTRONIC EQUIPMENT ADAPTED TO BE MOUNTED IN VEHICLES

[75] Inventors: Yoshio Minamide; Akio Itoh; Masashi Kawamoto; Masaaki Watanabe; Akira Nagashima; Motonori Satoh; Takashi Suzuki; Yuichi Mineo; Takafumi Yuki, all of Kawagoe, Japan

[73] Assignee: Pioneer Electronic Corporation, Tokyo, Japan

[21] Appl. No.: 492,002

[22] Filed: Mar. 12, 1990

[30] Foreign Application Priority Data

Jul. 12, 1989 [JP] Japan .............................. 1-179836

Jul. 14, 1989 [JP] Japan .............................. 1-181750

[51] Int. Cl.[5] ........................ B60R 25/10; B60Q 1/00

[52] U.S. Cl. .................................. 340/426; 340/457; 307/9.1; 307/10.1; 307/10.2; 455/346; 455/348

[58] Field of Search ................ 340/426, 457; 307/9.1, 307/10.1, 10.2; 455/346, 347, 348, 89, 90, 95, 128

[56] References Cited

U.S. PATENT DOCUMENTS 4,866,416 9/1989 Holzhauer et al. ................ 340/426

4,906,969 3/1990 Ghazarian .......................... 340/457

4,945,335 7/1990 Kimura et al. ...................... 340/426

*Primary Examiner*—Donnie L. Crosland

*Attorney, Agent, or Firm*—Sughrue, Mion, Zinn, Macpeak & Seas

[57] ABSTRACT

A burglarproof device includes an accessory switch detection circuit for detecting ON/OFF states of an accessory switch provided in a vehicle. An accessory switch detection signal is sent to an alarm generation circuit. The alarm generation circuit generates an alarm signal when the accessory switch is in an OFF state. This alarm signal alarms that a detachable electronic equipment adapted to be mounted in vehicles which has been mounted in a vehicle is actually attached to the vehicle. This alarm informs a driver that he forgets detachment of the electronic equipment adapted to be mounted in vehicles, thus preventing burglarly.

11 Claims, 7 Drawing Sheets

BURGLARPROOF DEVICE FOR ELECTRONIC EQUIPMENT ADAPTED TO BE MOUNTED IN VEHICLES

BACKGROUND OF THE INVENTION

This invention relates to a burglarproof or antitheft device for electronic equipment adapted to be mounted in vehicles such as car stereo equipment or a car radio receiver, etc.

For the car stereo equipment, there are two types: one type of the equipmemnt is fixedly attached within a cockpit in a vehicle and the other type thereof is removably attached with ease therewithin. The reason why the car stereo equipment is constructed so that it is removably attached as in the latter type is that an owner can detach the car stereo equipment as a burglarproof countermeasure when he is away from a vehicle. As the means for removably attaching the car stereo equipment, there are the essential part detachable system (the detaching system) and the whole detachable system (quick release system). The essential part detachable system is such that only the operating panel in which the main functional parts of the car stereo equipment is accommodated can be detached from the casing with a simple operation. On the other hand, the whole detachable system is such that the entirety of the car stereo equipment can be detached.

However, even in the case of either the essential part detachable system or the whole detachable system, there is the problem that a driver forgets detachment of the car stereo equipment or the operating panel when he is away from a vehicle. In this case, the fact that detachment is easy rather results in such a problem to allow burglary to be readily conducted.

Such a problem would arise not only in the case of the car stereo equipment but also in the case of other audio equipment such as a detachable radio receiver, etc.

SUMMARY OF THE INVENTION

An object of this invention is to provide a burglarproof device for electronic equipment adapted to be mounted in vehicles, which is capable of preventing failure to detach an electronic equipment adapted to be mounted in vehicles such as a car stereo equipment, etc.

This invention is directed to a burglarproof device for electronic equipment adapted to be mounted in vehicles, which is mounted in a vehicle and is supplied with a power through an accessory switch, wherein the burglarproof device comprises an accessory switch detection circuit for detecting ON/OFF states of the accessory switch, and an alarm generator circuit for outputting an alarm signal indicating that the electronic equipment in vehicles is in an attached state when the accessory switch is in an OFF state.

In accordance with this invention, when the accessory switch detection circuit detects the "OFF" state of the accessory switch, and at the same time the alarm generation circuit generates an alarm signal informing that the electronic equipment adapted to be mounted in vehicles is still in an attached state. As stated above, since an alarm is generated interlocking with the operation of the accessory switch carried out immediately before a driver gets off a vehicle, the driver's attention is excited. Thus, burglary can be prevented before occuring.

DESCRIPTION OF THE PREFERRED EMBODIMENTS

Preferred embodiments of this invention will now be described with reference to the attached drawings.

EXPLANATION OF THE OUTLINE OF THE MECHANISM FOR ATTACHING/DETACHING THE STEREO EQUIPMENT

For assisting understanding of this invention, the outline of the mechanism for attaching/detaching stereo equipment will be first described.

Figure 1:
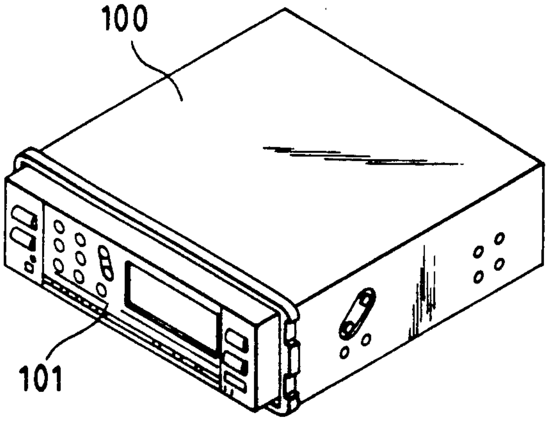
FIG. 1 is a perspective view showing the state before the operating panel of a car stereo equipment of the essential part detachable system is opened.
Figure 2:
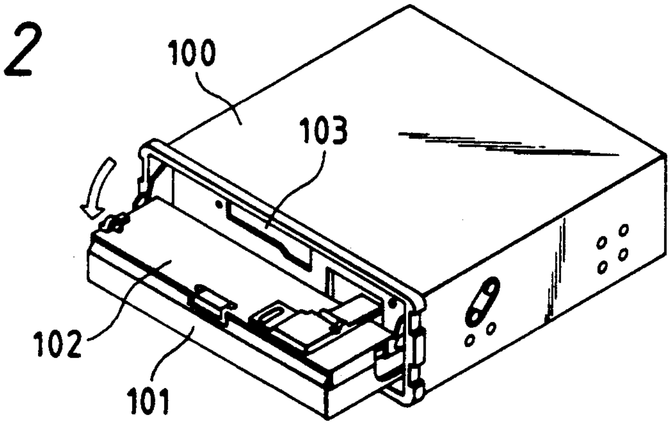
FIG. 2 is a perspective view showing the state after the above-mentioned operating panel is opened.
Figure 3:
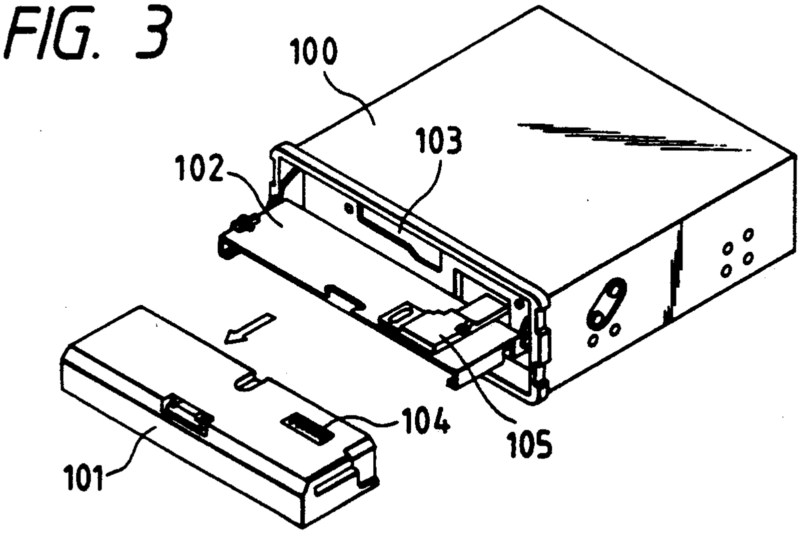
FIG. 3 is a perspective view showing the state where the above-mentioned panel is detached.

As shown in FIGS. 1 to 3, in accordance with the stereo equipment of the essential part detachable system, an operating panel 101 arranged on the front surface of a cabinet is detachably supported on an inner cover 102 hinged so that it can be opened and closed. At the time of detachment, the operating panel 01 is opened along with the inner cover or lid 102 (FIG. 2). Then, only the operating panel 101 can be detached (FIG. 3). Reference numeral 103 denotes a cassette tape insertion pocket. In the case of this system, since the main functional portions of the car stereo equipment are mounted within the operating panel 101, it is possible to prevent that equipment from functioning as the car stereo equipment under the state where the operating panel 101 is detached. In this way, a measure for prevention of burglary is taken.

In the above-mentioned stereo equipment of the essential part detachable system, a drive mechanism for opening the operating panel 101 is required. Where a car battery is used as a drive source, it may take place that the operating panel 101 is not opened by cutting off the engine key switch. This is true since the car stereo equipment of electric parts in an automotive vehicle belongs to accessory parts (auxiliary equipment), no power is supplied by cutting off the accessory switch. Although depending upon the mechanism for opening/-closing the operating panel 101, even if the operating panel 101 can be manually opened, there are instances where a driver forgets opening the operating panel 101, leading to the fact that the driver forgets detaching the operating panel 101.

On the other hand, in accordance with the whole detachable system, e.g., a channel or U-shaped handle is rotatably provided on an operating panel of a car stereo equipment. By drawing out this handle, the engagement of a mechanism for locking the fastened state between the cabinet 100 and the cockpit side is released. Thus, the entirety of the car stereo equipment is detached (publication of the Japanese Utility Model Application Laid Open No. 068843/87).

EXPLANATION OF THE ELECTRIC SYSTEM OF THE AUTOMOTIVE VEHICLE

The electric system of an autimotive vehicle to which this invention is applied will now be described.

Figure 4:
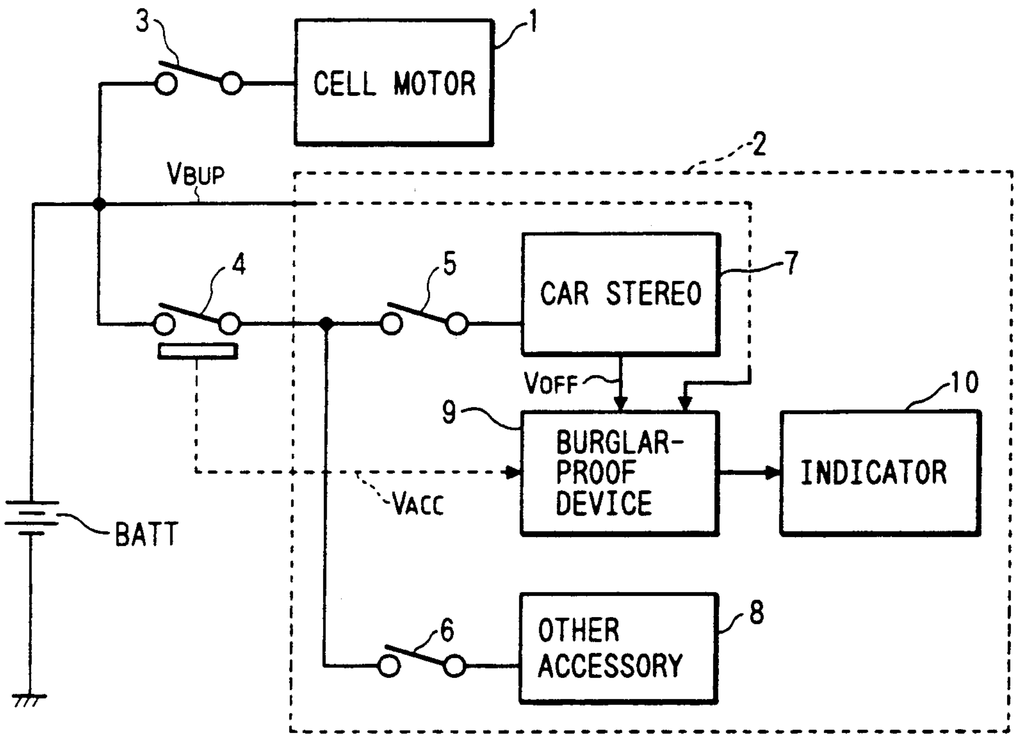
FIG. 4 is a block diagram showing the outline of an electric system of an automotive vehicle to which this invention is applied.

As shown in FIG. 4, the electric system in an autimotive vehicle is roughly classified into an engine system for delivering a power from a car battery BATT to a cell motor 1, and an accessory system for delivering a power to electric parts except for parts related to the engine, i.e., an accessory 2.

In the engine system, an ignition switch 3 for starting the cell motor 1 is provided therein.

In the accessory system, there is provided therein an accessory switch 4 for permitting the accessory 2 to be operative under the state where the engine is halted. Usually, a rotary switch of the three position type is used as the engine key. Ordinarily, this rotary switch functions as follows: At the position where the key can be pulled out, the engine is entirely stopped; at the next rotational position, the accessory switch 4 is turned on; and at the final rotational position, the ignition switch 3 is turned on. Further, in order to permit lighting even if the key is disconnected such as in the case of a room lamp, backup wiring directly connected to the car battery BATT is implemented to the accessory 2. Thus, a backup voltage $V_{BUP}$ can be delivered thereto. In the accessory 2, a car stereo equipment 7, a burglarproof device 9 for the car stereo equipment 7, and other accessory parts 8 are provided. Reference numerals 5 and 6 denote switches for operating individually the car stereo equipment 7 and other accessory parts 8, respectively.

First Embodiment

A first embodiment of a burglarproof device according to this invention will now be described by taking an example of the car stereo equipment 7 as an electronic equipment adapted to be mounted in vehicles on the premise of the above.

In order to prevent failure to detach the stereo equipment 7 using a backup voltage $V_{BUP}$ as a power supply voltage, the burglarproof device 9 is constructed, as shown in FIG. 4, to permit the car stereo equipment 7 to be in a detachable state interlocking with the accessory switch 4 and to generate an alarm from an indicator 10.

Figure 5:
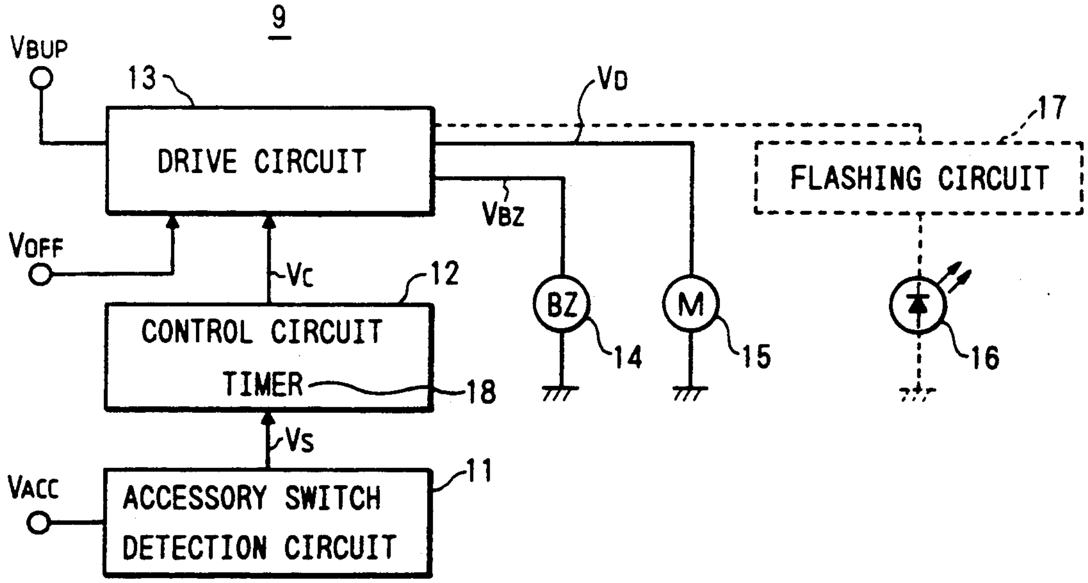
FIG. 5 is a block diagram showing a first embodiment of this invention.

The arrangement of the burglarproof device 9 is shown in FIG. 5. This burglarproof device 9 includes an accessory switch detection circuit 11 for detecting ON/OFF states of the accessory switch 4 depending upon whether or not a voltage supplied (hereinafter referred to as an ACC voltage) $V_{ACC}$ is present, a control circuit 12 for outputting a control command $V_C$ for an output operation of a detachment drive signal $V_D$ and an alarm signal $V_{BZ}$ on the basis of a signal $V_S$ detected from the detection circuit 11, and a drive circuit 13 responsive to the control command $V_C$ to output the detachment drive signal $V_D$ and the alarm signal $V_{BZ}$, and responsive to a detachment completion signal $V_{OFF}$ to stop outputting of the alarm signal $V_{BZ}$.

As the indicator 10, e.g., a buzzer 14 is used. As the opening/closing and drive means for the operating panel 101 shown in FIGS. to 3, an electric motor 15 is used. However, other means may be used in place of the electric motor 15.

Although not shown, the accessory switch detection circuit 11 may be of a structure using transistors to introduce an ACC voltage $V_{ACC}$ from the output terminal or the accessory switch 4 to generate a binary signal corresponding to presence and absence of the ACC voltage $V_{ACC}$.

The control circuit 12 can be realized by using a microcomputer for an panel controller mounted in a vehicle to set a program starting in response to inputting of the detection signal $V_S$. In addition, a CPU used in a car stereo equipment may be used for this purpose.

Although not shown, the drive circuit 13 may be comprised of a switching circuit using power transistors, etc., which responds to the control command $V_C$ inputted thereto to deliver the detachment drive signal $V_D$ and the alarm signal $V_{BZ}$ to the electric motor 15 and the buzzer 14 using the backup voltage $V_{BUP}$ as a power supply voltage, respectively.

The detachment completion signal $V_{OFF}$ can be generated by utilizing presence and absence of connection of a contact terminal 105 paired with the inner cover 102 side of a contact terminal 104 shown in FIG. 3 in the case where the car stereo equipment 7 is of the essential part detachable system. Alternatively, there may be employed an arrangement to provide a limit switch, etc on the inner cover 102 to output a detachment completion signal $V_{OFF}$ in an opened state.

The operation of the burglarproof device according to the first embodiment will now be described.

Figure 6:
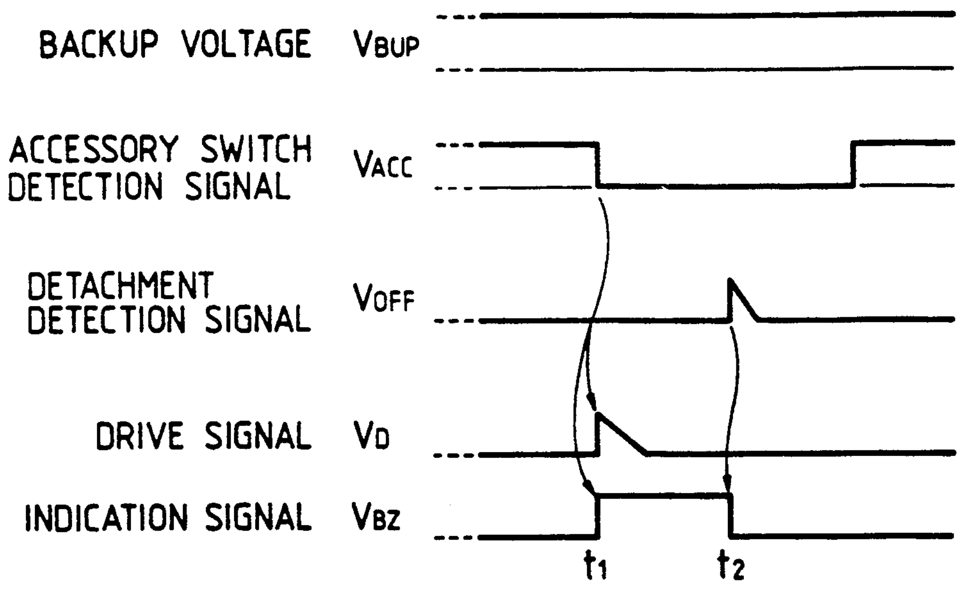
FIG. 6 is a timing chart of signals on respective portions of FIG. 5.

The timing chart of signals on respective components of the burglarproof device 9 (FIG. 5) is shown in FIG. 6. It is now assumed that this device is supplied with a backup voltage $V_{BUP}$ and that the accessory switch 4 is cut off at time $t_1$. Thus, the ACC voltage $V_{ACC}$ shifts from "H" level to "L" level. The accessory switch detection circuit 11 outputs a detection signal $V_S$. Responding to this detection signal $V_S$, the control circuit 12 outputs a control command $V_C$ to the drive circuit 13. Thus, the detachment drive signal $V_D$ and the alarm signal $V_{BZ}$ are delivered from the drive circuit 13 to the electric motor 15 and the buzzer 14, respectively. As a result, the electric motor 15 opens, e.g., as shown in FIG. 2, the operating panel 101 together with the inner cover 102. At the same time, an alarm tone is generated from the buzzer 14. As stated above, even if the accessory switch 4 is cut off, the inner cover 102 is securely and automatically opened and an alarm tone is generated, thus making it possible to prevent failure of detachment.

When a driver draws out the operating panel 101 from the inner cover 102 (see FIG. 3), a detachment completion signal $V_{OFF}$ is outputted, so the drive circuit 13 is reset. Thus, outputting of the alarm signal $V_{BZ}$ is stopped. This makes it possible to confirm that the detachment of the inner cover 102 has been completed.

While the indicator 10 indicates an alarm signal by sound in the above-described embodiment, an arrangement as indicated by broken lines in FIG. 5 may be employed such that a light emitting diode 16, etc. is used as a light emitting source to combine it wi&h a flashing circuit 17 to conduct an alarm, or an arrangement may be employed such that indication is carried out by both sound and light. In that case, it is sufficient to drive in parallel the buzzer 14 and the light emitting diode 16. Further, in order to avoid continuing to output an alarm signal, as indicated by broken lines in FIG. 5, a timer 18 may be provided in the control circuit 12, thus to limit the duration time of the alarm signal to predetermined time.

Further, the equipment subject to burglarproofing is not limited to car stereo equipment 7. Namely, it is not departing from the scope of this invention that this invention is applied to a car radio receiver included in other accessory parts 8.

In addition, it is needless to say that this invention may be applied to the car stereo equipment 7 or other accessory parts 8 irrespective of whether the car stereo equipment 7 or other accessory assembly 8 is based on the essential part detachable system or the whole detachable system.

Second Embodiment

Figure 7:
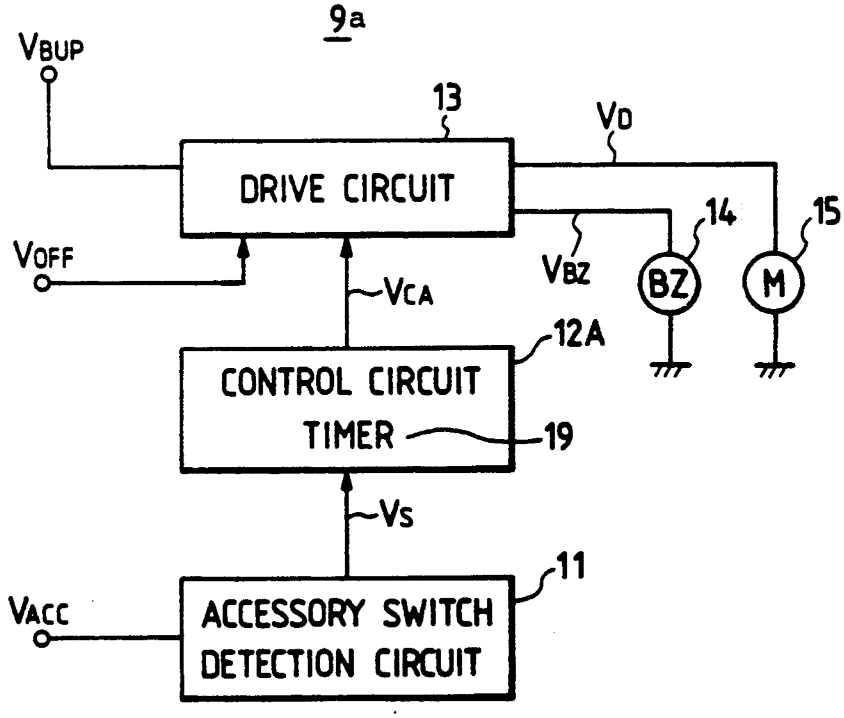
FIG. 7 is a block diagram showing a second embodiment of this invention.

A second embodiment of this invention is shown in FIG. 7. The second embodiment is characterized in that a control command $V_{CA}$ for outputting an alarm signal $V_{BZ}$ is outputted after a predetermined time T passes from the time when a detachment drive signal $V_D$ and the accessory switch 4 are in an "OFF" state, on the basis of a detection signal $V_S$ from the accessory switch detection circuit 11.

Figure 8:
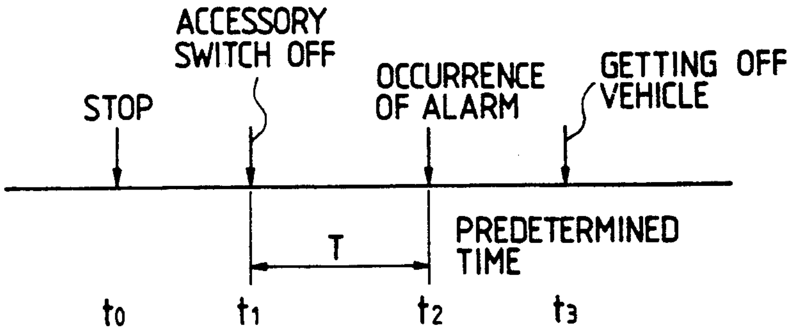
FIG. 8 is a timing chart for explaining a general action when a driver gets off a vehicle.

The reason why an alarm signal $V_{BZ}$ is generated after a predetermined time T passes from the time when the accessory switch 4 is brought into an "OFF" state is as follows Namely, a general operation when a driver gets off a vehicle is shown as the timing chart in FIG. 8. When a vehicle stops (time $t_0$) , a driver rotates the engine key to cut off the engine thereafter to cut off the accessory switch 4 (time $t_1$). Ordinarily, the driver carries out various operations until he further rotates the engine key to pull out it and, thereafter to open the door of the driver's seat to get off the vehicle (time $t_3$) For performing such operations, it takes a predetermined time T. At this time, if the driver cuts off the accessory switch 4, an alarm tone begins ringing at the same time in order to indicate an alarm of failure of detachment of the car stereo equipment 7 and such an alarm tone is continued, the driver feels troublesome. On the other hand, the halt of the engine is not limited to that based on a voluntary will of a driver. There might occur instances where an engine stop would occur for any reason. In this case, the cell motor 1 is rotated to restart the engine. When the cell motor 1 is rotated in response to the operation of the ignition switch 3, a voltage drop would occur. This voltage drop is relatively large, and a state equivalent to the state where the accessory switch 4 is cut off would occur according to circumstances. Accordingly, there may take place an inconvenience such that the burglarproof device erroneously operates when the cell motor is simply rotated, resulting in ringing of an alarm tone.

An example of the arrangement of a burglarproof device 9A according to this embodiment where the above-mentioned circumstances are taken into consideration is shown in FIG. 7. In the burglarproof device 9A, a control circuit 12A includes alarm delay means 19 for producing an alarm signal $V_{BZ}$ after a predetermined time T passes from the time when the accessory switch 4 is in an "OFF" state. As alarm delay means 19, a timer may be used. The timer can be embodied by adding a timer circuit to the output stage of the circuit 12A. However, since the control circuit 12A in this embodiment is constituted by using a microcomputer in the same manner as in the first embodiment, the timer is realized by incorporating a step for delay into a program set in the microcomputer. This is indicated in a model form by reference numeral 19 in FIG. 7. Since other components in FIG. 7 are the same as those in the first embodiment shown in FIG. 5, the description of FIG. 5 is quoted for their explanation.

In this embodiment, backup voltage $V_{BUP}$ is used as a power supply voltage for the burglarproof device 9 (see FIG. 4). This is because the burglarproof device 9 must be activated any time.

The operation of the burglarproof device according to the second embodiment will now be described.

Figure 9:
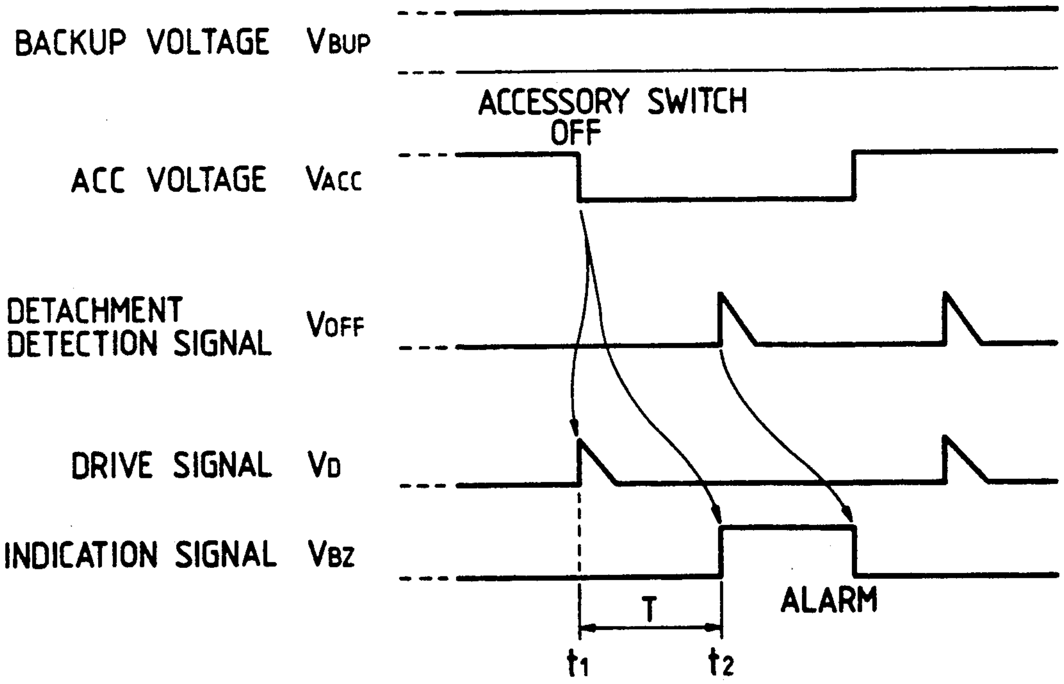
FIG. 9 is a timing chart of signals on respective portions of FIG. 7.

The timing chart of signals on respective portions of the above-mentioned burglarproof device 9A is shown in FIG. 9. It is now assumed that this device 9A is supplied with a backup voltage $V_{BUP}$, and that the accessory switch 4 is cut off at time $t_1$. The ACC voltage $V_{ACC}$ shifts from "H" level to "L" level. Thus, the accessory switch detection circuit 11 outputs a detection signal $V_S$. The control circuit 12A outputs a control command $V_{CA}$ after a predetermined time T passes from the time when the detection signal $V_S$ occurs (time T1 in FIG. 9) to deliver, from the drive circuit 13, a detachment drive signal $V_D$ and an alarm signal $V_{BZ}$ to the electric motor 15 and the buzzer 14, respectively. Thus, the electric motor 15 opens, e.g., as shown in FIG. 2, the operating panel 101 together with the inner cover 192. At the same time, an alarm tone is produced from the buzzer 14. As stated above, even if the accessory switch 4 is cut off, since the inner cover 192 is securely and automatically opened, and an alarm tone is produced with a time margin, failure of detachment can be prevented.

When a driver pulls out the operating panel 101 from the inner cover 102, e.g., as shown in FIG. 3, a detachment completion signal $V_{OFF}$ is outputted, so the drive circuit 13 is reset. Thus, outputting of the alarm signal $V_{BZ}$ is stopped. This makes it possible to confirm that detachment of the inner cover 102 is completed.

As stated above, in accordance with this embodiment, even in the case where the accessory switch is cut off, an electronic equipment adapted to be mounted in vehicles can be detached or disconnected from the vehicle. Further, since an alarm signal is produced with a time margin of a predetermined time T, the possibility of failure to detach the electronic equipment adapted to be mounted in vehicles is eliminated, thus making it possible to securely prevent burglary.

Third Embodiment

Figure 10:
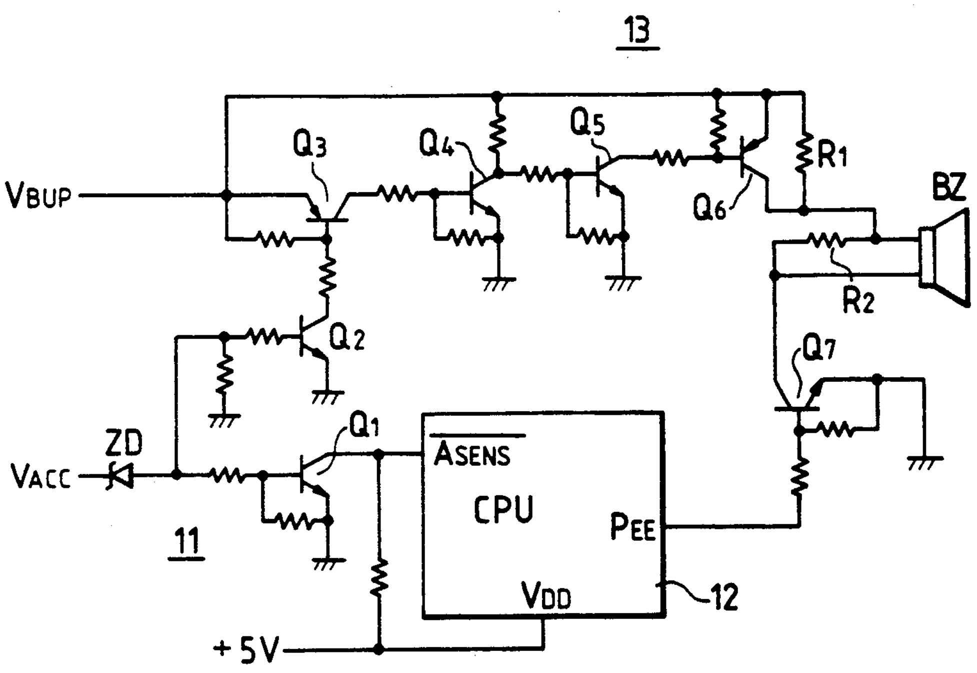
FIG. 10 is a block diagram showing a third embodiment of this invention.

A third embodiment of this invention will now be described. The arrangement of this embodiment is shown in FIG. 10. The third embodiment is characterized in that not only an alarm signal $V_{BZ}$ is produced after a predetermined time T passes from the time when the accessory switch 4 is brought into an "OFF" state as in the second embodiment, but also the sound of the alarm signal $V_{BZ}$ is set to a sound larger than the sound of an operation confirmation tone (sound of "pi") produced when a push-button on the operating panel of the car stereo equipment 7 is depressed.

In FIG. 10, the accessory switch detection circuit 11 is constituted by making use of a CPU 12 having, as an input circuit comprising a Zener diode ZD and a transistor $Q_1$. The CPU incorporated in the car stereo equipment 7 may be utilized as the abovementioned CPU 12. This CPU 12 also functions as a control circuit. The drive circuit 13 is formed by using transistors $Q_2$, $Q_3$, $Q_4$, $Q_5$, $Q_6$ and $Q_7$ and resistors $R_1$ and $R_2$.

Figure 13:
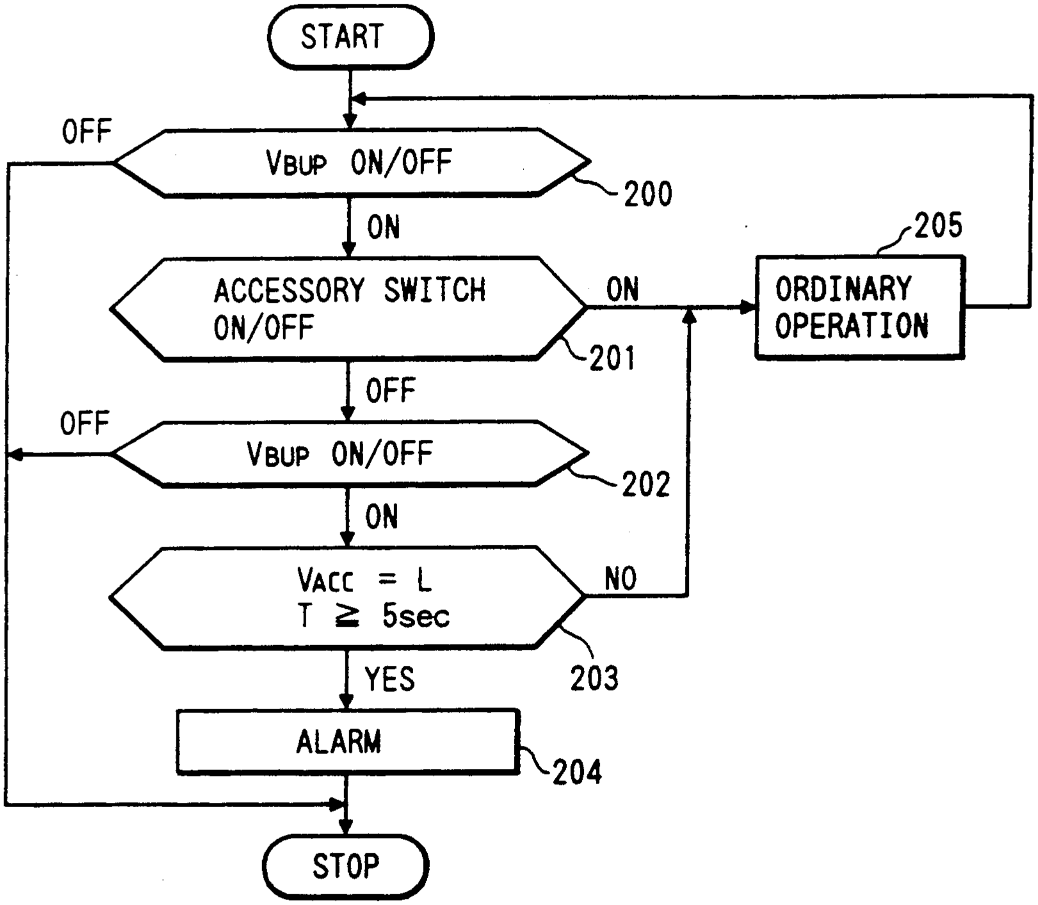
FIG. 13 is a flowchart showing the operation of FIG. 10.

The operation of the burglarproof device according to the third embodiment will now be described (see FIG. 13).

At the time of the normal operation (step 205) of the car stereo equipment 7, the accessory switch 4 and the backup voltage $V_{BUP}$ are in an "ON" state, respectively (step 200, 201). As a result, the transistor $Q_1$ is turned ON. Thus, the input signal logic of the input port A SENS of the CPU 12 represents "L" level. At this time, the transistors $Q_2$, $Q_3$ and $Q_4$ are turned ON and the transistors $Q_5$ and $Q_6$ are turned OFF. As a result, a voltage applied to the buzzer 14 is determined by the divisional ratio between the resistors $R_1$ and $R_2$. When the port PEE of the CPU 12 is brought into "H" level by ON operation of the operating push-button, so the transistor $Q_7$ is turned ON, a relatively small sound $V_L$ (FIG. 11) is outputted from the buzzer 14. This operation is carried out in a manner similar to the above in connection with respective push-buttons operated.

Figure 11:
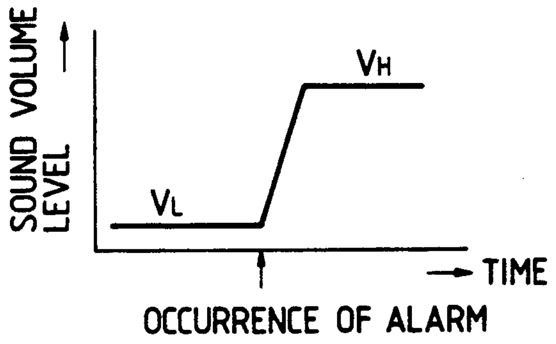
FIG. 11 is an explanatory view of an output state of an alarm signal is FIG. 10.

On the other hand, when the accessory switch 4 is brought into an "OFF" state (step 201), the signal logic of the input port A SENS of the CPU 12 shifts to "H" level. The CPU 12 detects that the ACC voltage $V_{ACC}$ has been brought into "L" level in a state wherein the backup voltage $V_{BUP}$ is in an "ON" state (steps 202, 203). Thus, the transistors $Q_2$, $Q_3$ and $Q_4$ are turned OFF, and the transistors $Q_5$ and $Q_6$ are turned ON. As a result, the resistor $R_1$ is bypassed. The backup voltage VBUP is applied to the buzzer 14 as it is. In the case where the state of the input level "H" of the input port A SENS is continued for five seconds or more, the port PEE of the CPU 12 allows the transistor $Q_7$ to be turned on and off with changes of "L", "H", "L" and "H" to output an alarm signal $V_{BZ}$ (step 204). Since a voltage applied to the buzzer BZ is high, the alarm tone at this time becomes a sound $V_H$ larger than an ordinary operating confirmation tone (FIG. 11). The driver can recognize an alarm by the difference between these sound volume levels.

Figure 12:
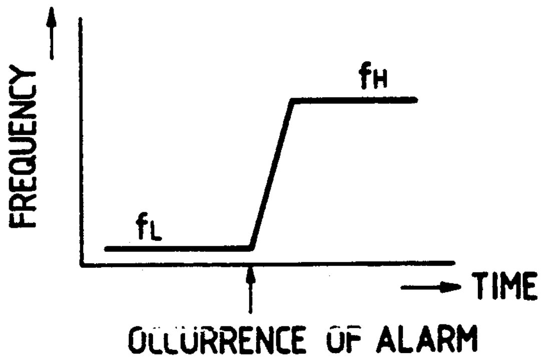
FIG. 12 is an explanatory view of an output state of another alarm signal in FIG. 10.

It is to be noted that while the alarm signal $V_{BZ}$ is set to have a sound volume level larger than the ordinary operating confirmation sound in this embodiment, a scheme may be employed instead of changes in the sound volume level to abruptly raise the frequency of a signal tone from a low frequency $f_L$ to a high frequency $f_H$ as in the case of FIG. 12.

In the same manner as in the first embodiment, it is assumed that the alarm signal $V_{BZ}$ is automatically reset in a predetermined time by the detachment completion signal $V_{OFF}$.

Fourth Embodiment

Figure 14:
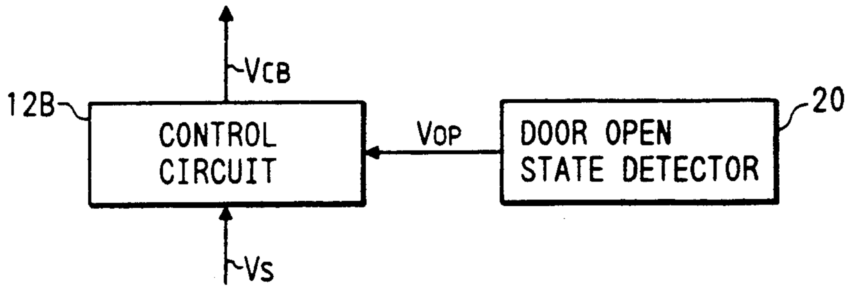
FIG. 14 is a block diagram showing a fourth embodiment of this invention.
Figure 15:
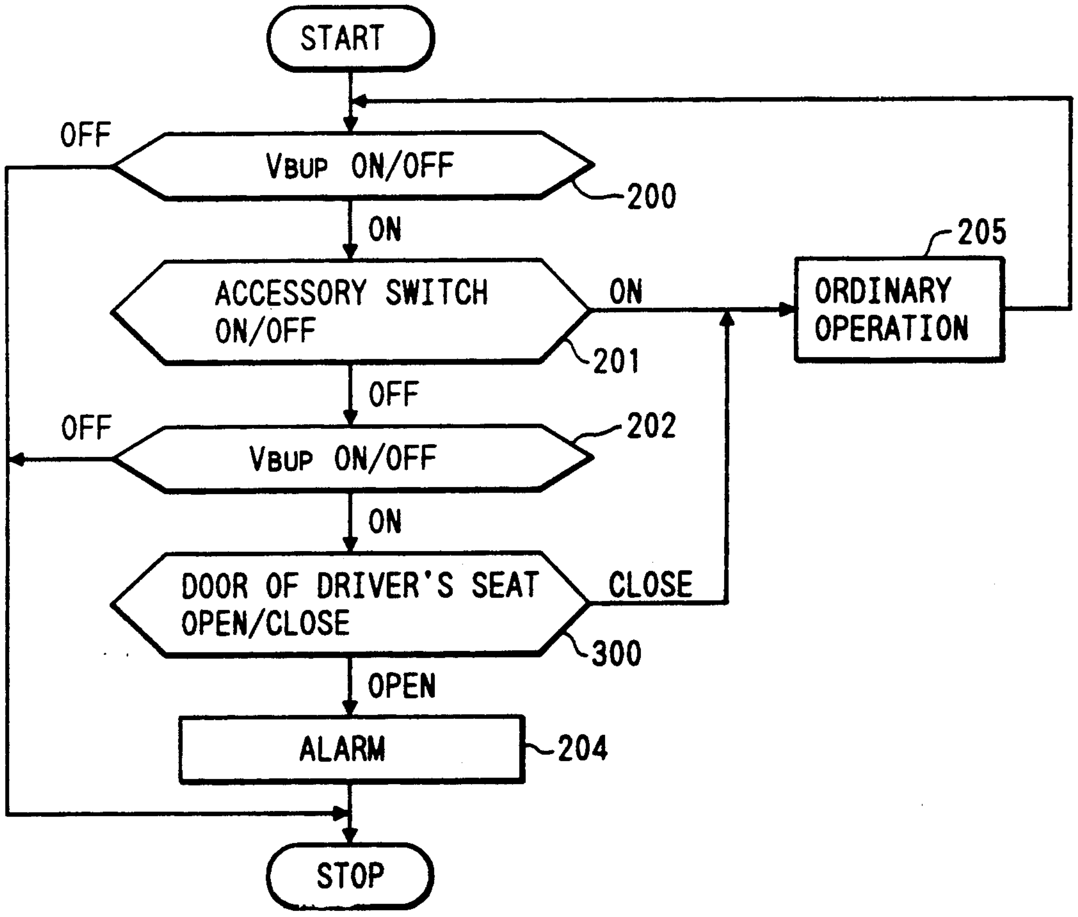
FIG. 15 is a flowchart showing the operation of the embodiment shown in FIG. 14.

A fourth embodiment of this invention is shown in FIGS. 14 and 15. In this embodiment, there is disclosed an arrangement to output an alarm signal $V_{BZ}$ when the door of the driver's seat of an automotive vehicle is opened in which a car stereo equipment 7 of the electronic equipment adapted to be mounted in vehicles is mounted after the accessory switch 4 has been brought into an "OFF" state on the basis of a detection signal $V_S$ from the accessory switch detection circuit 11.

The reason why the alarm signal $V_{BZ}$ is outputted when the door of the driver's seat is opened as stated above is that it is considered to be most effective that the alarm signal is given at this time.

With the above in view, a burglarproof device according to this embodiment includes, as shown in FIG. 14, door open state detection means 20 and a control circuit 12B. As the door open state detection means 20, a limit switch for interlocking with a mechanism for opening and closing the door of the driver's seat, or the like may be used. When a detection signal $V_{OP}$ is delivered from the door open state detection means 20 to the control circuit 12B (step 300), the control circuit 12B effects a control to confirm that the accessory switch 4 has been in an OFF state (step 201) thereafter to output a control command $V_{CB}$ on the condition of the logical product (AND) of the signal indicative of that confirmation and the detection signal $V_{OP}$ to generate an alarm signal (step 204). It is to be noted that other components of the burglarproof device in FIG. 14 are the same those shown in FIG. 5, respectively, and that other steps in FIG. 15 are the same as those shown in FIG. 13, respectively.

As stated above, in accordance with this embodiment, since an approach is employed to output an alarm signal at a timing in conformity with a pattern of action of a driver in place of using an approach to output an alarm uniformly at the timing when a predetermined time T passes after accessory switch 4 is turned OFF, failure to detach an electronic equipment can be effectively prevented.

This invention may be implemented in other various forms without departing from the spirit or the principal features of the invention. For this reason, the above-described embodiments are only illustrative in all respects, and therefore should not be restrictively comprehended. The scope of this invention is indicated by the scope of patent claims, and is not therefore restricted by the description of the specification by any means. In addition, modifications or alterations belonging to a range equivalent to the scope of patent claims are all included within the scope of this invention.

What is claimed is:

1. A burglarproof device for electronic equipment adapted to be mounted in vehicles, which is detachably mounted in a vehicle and is supplied with power than an accessory switch, said electronic equipment having an operating panel detachably supported on a cover which is opened and closed, said burglarproof device comprising:

accessory switch detection circuit means for detecting ON/OFF states of said accessory switch, and alarm generation circuit means for outputting an alarm signal informing that said electronic equipment adapted to be mounted in a vehicle is in an attached state when said accessory switch is in the OFF state, said alarm generation circuit means including drive circuit means for generating a drive signal for opening and closing said cover.

2. A burglarproof device as set forth in claim 1, wherein said alarm generation circuit means further comprises:

control circuit means for outputting a control command signal for generation of said alarm signal on the basis of a detection signal from said accessory switch detection circuit means, said drive circuit means outputting said drive signal on the basis of said control command signal.

3. A burglarproof device as set forth in claim 1, wherein said alarm generation circuit means comprises timer means for outputting an alarm signal when a door on the driver's side of an automotive vehicle in which said electronic equipment adapted to be mounted in a vehicle is mounted is opened after said accessory switch is brought into an OFF state.

4. A burglarproof device as set forth in claim 1, wherein said alarm generation circuit means further comprises timer means for stopping said alarm signal after a predetermined time passes from the time when said alarm signal is generated.

5. A burglarproof device as set forth in claim 1, which further comprises indication means for indicating said alarm signal.

6. A burglarproof device as set forth in claim 5, wherein said indication means comprises alarm tone generator means.

7. A burglarproof device as set forth in claim 6, wherein said operating panel includes an operating push-button adapted to generate a beep tone at the time of depressing operation, said alarm tone generator means being constructed to generate an alarm tone having a frequency different from that of said beep tone.

8. A burglarproof device as set forth in claim 5, wherein said indication means is comprised of an alarm light generator.

9. A burglarproof device as set forth in claim 2, wherein said alarm signal is output when the detachable operating panel is mounted on said cover in a state wherein said accessory switch is in the OFF state.

10. A burglarproof device for electronic equipment, adapted to be mounted in vehicles, which is detachably mounted in a vehicle and is supplied with power through an accessory switch, said burglarproof device comprising:

accessory switch detection circuit means for detecting ON/OFF states of said accessory switch, and alarm generation circuit means for outputting an alarm signal informing that said electronic equipment is in an attached state when said accessory switch is in the OFF state, said alarm generation circuit means further comprising:

timer means for outputting an alarm signal informing that said electronic equipment is in an attached state after a predetermined time passes from the time when said accessory switch is in an OFF state.

11. A burglarproof device for electronic equipment, adapted to be mounted in vehicles, which is detachably mounted in a vehicle and is supplied with power through an accessory switch, said burglarproof device comprising:

accessory switch detection circuit means for detecting ON/OFF states of said accessory switch, and alarm generation circuit means for outputting an alarm signal informing that said electronic equipment is in an attached state when said accessory switch is in the OFF state, said electronic equipment including an operating panel having an operating push-button adapted to generate a beep tone when depressed, said alarm tone generator means being constructed to generate an alarm tone having a sound volume larger than that of said beep tone.

* * * * *